(12) United States Patent
Dhuse et al.

(10) Patent No.: US 9,996,413 B2
(45) Date of Patent: Jun. 12, 2018

(54) ENSURING DATA INTEGRITY ON A DISPERSED STORAGE GRID

(75) Inventors: Greg Dhuse, Chicago, IL (US); Vance Thornton, Chicago, IL (US); Jason Resch, Chicago, IL (US); Ilya Volvovski, Chicago, IL (US); Dusty Hendrickson, Chicago, IL (US); John Quigley, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 11/973,542

(22) Filed: Oct. 9, 2007

(65) Prior Publication Data

US 2009/0094250 A1 Apr. 9, 2009

(51) Int. Cl.
 *G06F 11/00* (2006.01)
 *G06F 11/10* (2006.01)

(52) U.S. Cl.
 CPC ...... *G06F 11/1004* (2013.01); *G06F 11/1076* (2013.01); *G06F 2211/1088* (2013.01)

(58) Field of Classification Search
 CPC .......... G06F 11/1004; G06F 11/1076
 USPC ............... 714/6; 711/153; 709/215; 707/693
 See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,581,690 A | 12/1996 | Ellis et al. | |
| 5,774,643 A | 6/1998 | Lubbers et al. | |
| 5,802,364 A | 9/1998 | Senator et al. | |
| 5,809,285 A | 9/1998 | Hilland | |
| 5,832,000 A * | 11/1998 | Lin et al. ................ 714/755 | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |

(Continued)

FOREIGN PATENT DOCUMENTS

| | | |
|---|---|---|
| EP | 1191442 A2 | 3/2002 |
| WO | 2007103533 A1 | 9/2007 |

OTHER PUBLICATIONS

Chung, "An Automatic Data Segmentation Method for 3D Measured Data Points," National Taiwan University, 1998, pp. 1-8.

(Continued)

*Primary Examiner* — Philip Guyton
(74) *Attorney, Agent, or Firm* — Garlick & Markison; Timothy W. Markison

(57) ABSTRACT

An improved system is disclosed for ensuring the integrity of data stored on a dispersed data storage network. Checksums are used to ensure integrity of both data segments and data slices. Checksums appended to data slices are checked by receiving slice servers to ensure that no errors occurred during transmission. Slice servers also periodically recalculate checksums for stored data slices to ensure that data slices have not been corrupted during storage. Checksums appended to data segments are checked when data segments are read from the storage network.

17 Claims, 10 Drawing Sheets

(56) References Cited

U.S. PATENT DOCUMENTS

| | | | |
|---|---|---|---|
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,397,365 B1* | 5/2002 | Brewer et al. | 714/766 |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2* | 11/2004 | Moulton et al. | 714/6 |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,461 B1 | 12/2006 | Kiselev et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,278,067 B1 | 10/2007 | Coatney et al. | |
| 7,506,155 B1* | 3/2009 | Stewart et al. | 713/152 |
| 7,516,354 B2* | 4/2009 | Nguyen et al. | 714/6 |
| 7,636,724 B2 | 12/2009 | de la Torre et al. | |
| 7,721,157 B2* | 5/2010 | Spitz et al. | 714/47 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1* | 5/2003 | Shu | 707/1 |
| 2003/0233455 A1* | 12/2003 | Leber et al. | 709/226 |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0144514 A1 | 6/2005 | Ulrich et al. | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0143359 A1 | 6/2007 | Uppala | |
| 2007/0150481 A1* | 6/2007 | Song et al. | 707/10 |
| 2007/0283167 A1 | 6/2007 | Venters, III et al. | |
| 2007/0174192 A1 | 7/2007 | Gladwin et al. | |
| 2007/0214255 A1 | 9/2007 | Spitz et al. | |
| 2007/0214285 A1 | 9/2007 | Au et al. | |
| 2007/0234110 A1 | 10/2007 | Soran et al. | |
| 2007/0282868 A1* | 12/2007 | Wanigasekara-Mohotti et al. | 707/100 |
| 2008/0244030 A1* | 10/2008 | Leitheiser | 709/211 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0218037 A1* | 8/2010 | Swartz et al. | 714/6 |

OTHER PUBLICATIONS

Young, International Search Report and Written Opinion of the International Searching Authority for PCT/US 08/77162, dated Dec. 1, 2008.

Shamir, "How to Share a Secret" Communications of the ACM, vol. 22, No. 11, Nov. 1979.

Rabin, "Efficient Dispersal of Information for Security, Load Balancing, and Fault Tolerance" Journal of the Association for Computer Machinery, vol. 36, No. 2, Apr. 1989.

Xin, et al.; Evaluation of Distributed Recovery in Large-Scale Storage Systems; 13th IEEE International Symposium on High Performance Distributed Computing; Jun. 2004; pp. 172-181.

Satran, et al.; Internet Small Computer Systems Interface (iSCSI); IETF Network Working Group; RFC 3720; Apr. 2004; pp. 1-257.

Sermersheim; Lightweight Directory Access Protocol (LDAP): The Protocol; IETF Network Working Group; RFC 4511; Jun. 2006; pp. 1-68.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

European Patent Office; Extended European Search Report; dated Jul. 19, 2012; 7 pages.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

European Patent Office; Extended European Search Report; EP Application No. 09727284.3; dated Oct. 29, 2015; 8 pgs.

* cited by examiner

ENSURING DATA INTEGRITY ON A DISPERSED STORAGE GRID

FIELD OF THE INVENTION

The present invention relates generally to systems, apparatus, and methods for distributed data storage, and more particularly to systems, apparatus, and methods for distributed data storage using an information dispersal algorithm so that no one location will store an entire copy of stored data, and more particularly still to systems, apparatus, and methods for ensuring data integrity on a dispersed data storage network.

DESCRIPTION OF THE PRIOR ART

Storing data in digital form is a well-known problem associated with all computer systems, and numerous solutions to this problem are known in the art. The simplest solution involves merely storing digital data in a single location, such as a punch film, hard drive, or FLASH memory device. However, storage of data in a single location is inherently unreliable. The device storing the data can malfunction or be destroyed through natural disasters, such as a flood, or through a malicious act, such as arson. In addition, digital data is generally stored in a usable file, such as a document that can be opened with the appropriate word processing software, or a financial ledger that can be opened with the appropriate spreadsheet software. Storing an entire usable file in a single location is also inherently insecure as a malicious hacker only need compromise that one location to obtain access to the usable file.

To address reliability concerns, digital data is often "backed-up," i.e., an additional copy of the digital data is made and maintained in a separate physical location. For example, a backup tape of all network drives may be made by a small office and maintained at the home of a trusted employee. When a backup of digital data exists, the destruction of either the original device holding the digital data or the backup will not compromise the digital data. However, the existence of the backup exacerbates the security problem, as a malicious hacker can choose between two locations from which to obtain the digital data. Further, the site where the backup is stored may be far less secure than the original location of the digital data, such as in the case when an employee stores the tape in her home.

Another method used to address reliability and performance concerns is the use of a Redundant Array of Independent Drives ("RAID"). RAID refers to a collection of data storage schemes that divide and replicate data among multiple storage units. Different configurations of RAID provide increased performance, improved reliability, or both increased performance and improved reliability. In certain configurations of RAID, when digital data is stored, it is split into multiple units, referred to as "stripes," each of which is stored on a separate drive. Data striping is performed in an algorithmically certain way so that the data can be reconstructed. While certain RAID configurations can improve reliability, RAID does nothing to address security concerns associated with digital data storage.

One method that prior art solutions have addressed security concerns is through the use of encryption. Encrypted data is mathematically coded so that only users with access to a certain key can decrypt and use the data. Common forms of encryption include DES, AES, RSA, and others. While modern encryption methods are difficult to break, numerous instances of successful attacks are known, some of which have resulted in valuable data being compromised.

Digitally stored data is subject to degradation over time, although such degradation tends to be extremely minor and the time periods involved tend to be much longer than for analog data storage. Nonetheless, if a single bit within a file comprised of millions of bits changes from a zero to a one or vice versa, the integrity of the file has been compromised, and its usability becomes suspect. Further, errors occur more frequently when digital data is transmitted due to noise in the transmission medium. Various prior art techniques have been devised to detect when a digital data segment has been compromised. One early form of error detection is known as parity, wherein a single bit is appended to each transmitted byte or word of data. The parity bit is set so that the total number of one bits in the transmitted byte or word is either even or odd. The receiving processor then checks the received byte or word for the appropriate parity, and, if it is incorrect, asks that the byte or word be resent.

Another form of error detection is the use of a checksum. There are many different types of checksums including classic checksums, cryptographic hash functions, digital signatures, cyclic redundancy checks, and the use of human readable "check digits" by the postal service and libraries. All of these techniques involve performing a mathematical calculation over an entire data segment to arrive at a checksum, which is appended to the data segment. For stored data, the checksum for the data segment can be recalculated periodically, and checked against the previously calculated checksum appended to the data segment. For transmitted data, the checksum is calculated by the transmitter and appended to the data segment. The receiver then recalculates the checksum for the received data segment, and if it does not match the checksum appended to the data segment, requests that it be retransmitted.

In 1979, two researchers independently developed a method for splitting data among multiple recipients called "secret sharing." One of the characteristics of secret sharing is that a piece of data may be split among n recipients, but cannot be known unless at least t recipients share their data, where n≥t. For example, a trivial form of secret sharing can be implemented by assigning a single random byte to every recipient but one, who would receive the actual data byte after it had been bitwise exclusive orred with the random bytes. In other words, for a group of four recipients, three of the recipients would be given random bytes, and the fourth would be given a byte calculated by the following formula:

$$s'=s \oplus r_a \oplus r_b \oplus r_c,$$

where s is the original source data, $r_a$, $r_b$, and $r_c$ are random bytes given to three of the four recipients, and s' is the encoded byte given to the fourth recipient. The original byte s can be recovered by bitwise exclusive-orring all four bytes together.

The problem of reconstructing data stored on a digital medium that is subject to damage has also been addressed in the prior art. In particular, Reed-Solomon and Cauchy Reed-Solomon coding are two well-known methods of dividing encoded information into multiple slices so that the original information can be reassembled even if all of the slices are not available. Reed-Solomon coding, Cauchy Reed-Solomon coding, and other data coding techniques are described in "Erasure Codes for Storage Applications," by Dr. James S. Plank, which is hereby incorporated by reference.

Schemes for implementing dispersed data storage networks ("DDSN"), which are also known as dispersed data storage grids, are also known in the art. In particular, U.S. Pat. No. 5,485,474, issued to Michael O. Rabin, describes a system for splitting a segment of digital information into n data slices, which are stored in separate devices. When the data segment must be retrieved, only m of the original data slices are required to reconstruct the data segment, where n>m.

While DDSN's can theoretically be implemented to provide any desired level of reliability, practical considerations tend to make this impossible in prior art solutions. For example, DDSNs rely on storage media to store data slices. This storage media, like all storage media, will degrade over time. Furthermore, DDSN's rely on numerous transmissions to physically disparate slice servers, and data slices may become corrupted during transmissions. While TCP utilizes a CRC in every transmitted packet, the reliability provided by this CRC is not sufficient for critical data storage.

OBJECTS OF THE INVENTION

Accordingly, it is an object of this invention to provide a system, apparatus, and method for ensuring data integrity on a dispersed data storage network.

Another object of this invention is to provide a self-healing dispersed data storage grid.

SUMMARY OF THE INVENTION

The disclosed invention achieves its objectives by providing an improved method for insuring the integrity of data stored on a dispersed data storage network. A checksum is calculated for a data segment to be written to a DDSN. The checksum is appended to the data segment, which is sliced into a plurality of data slices. A second set of checksums is calculated for and appended to the different data slices, which are then transmitted to different slice servers. For each receiving slice server, a checksum is calculated for the received data slice, and compared to the checksum appended to the received data slice. If the checksums vary, the receiving slice server marks the data slice as corrupted, and requests that the corrupted data slice be resent.

In another aspect of the disclosed invention, a distributed computer system implements a dispersed data storage network. In this system, a rebuilder application periodically recalculates checksums for data slices stored on a plurality of slice servers. Where the calculated checksum does not match the checksum appended to a stored data slice, the data slice is marked as corrupted. The rebuilder application then identifies the stored data segment associated with the corrupted data slice, and issues read requests to other slice servers holding data slices corresponding to the identified data segment. The data segment is rebuilt and re-sliced, and any slice servers containing corrupted data are sent new data slices to replace the corrupted data slices.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE ILLUSTRATED EMBODIMENT

Figure 1:
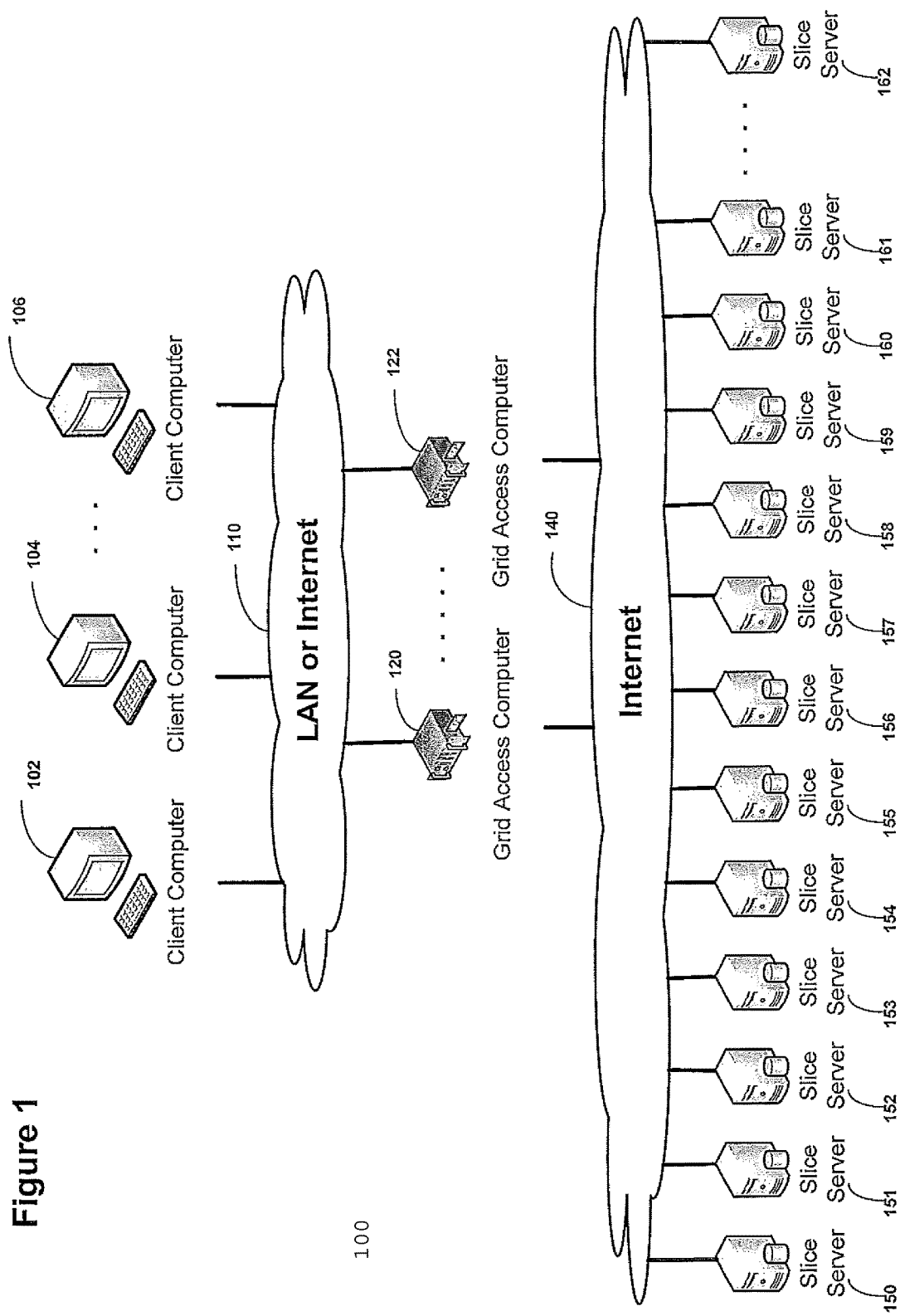
FIG. 1 is a network diagram of a dispersed data storage network constructed in accordance with an embodiment of the disclosed invention.

Turning to the Figures, and to FIG. 1 in particular, a distributed computer system implementing a dispersed data storage grid 100 is shown. An arbitrary number of slice servers 150-162 store data slices sent to them by networked source computers 102,104,106 via the Internet 140. As illustrated, some number of grid access computers 120,122 allows access to the slice servers 150-162 by the source computers 102,104,106 via a local area network LAN) or the Internet 110.

As explained herein, the disclosed invention works to ensure integrity of data stored in a DDSN not only by using checksums on each stored data segment as well as the constituent data slices, but also by reconstructing corrupted data slices as well. In accordance with the disclosed invention, grid access computers 120, 122 will calculate a checksum for each data segment to be stored, and append the checksum to the data segment prior to slicing. The data segment is then sliced in accordance with an information dispersal algorithm, and checksums are calculated and appended to each of the data slices. The data slices are then forwarded to slice servers 150-162, where the data slices are stored.

In addition, grid access computers 120, 122 also recreate data slices that have become corrupted, or were destroyed. If during operation of the DDSN 100, it is detected that a particular data slice has been corrupted or destroyed, a different data slice will be requested from a different slice server 150-162. Assuming that sufficient non-corrupted data slices exist to successfully reconstruct the original data segment, the reconstructed data segment will be re-sliced, and the corrupted data slice will be replaced with a non-corrupted version. Further, a rebuilder application operating within the DDSN periodically walks through all data slices stored on the DDSN. When a corrupted data slice is found, the rebuilder application identifies the data segment corresponding to the corrupted data slice, rebuilds the identified data segment, and rewrites the corrupted slice.

Figure 2:
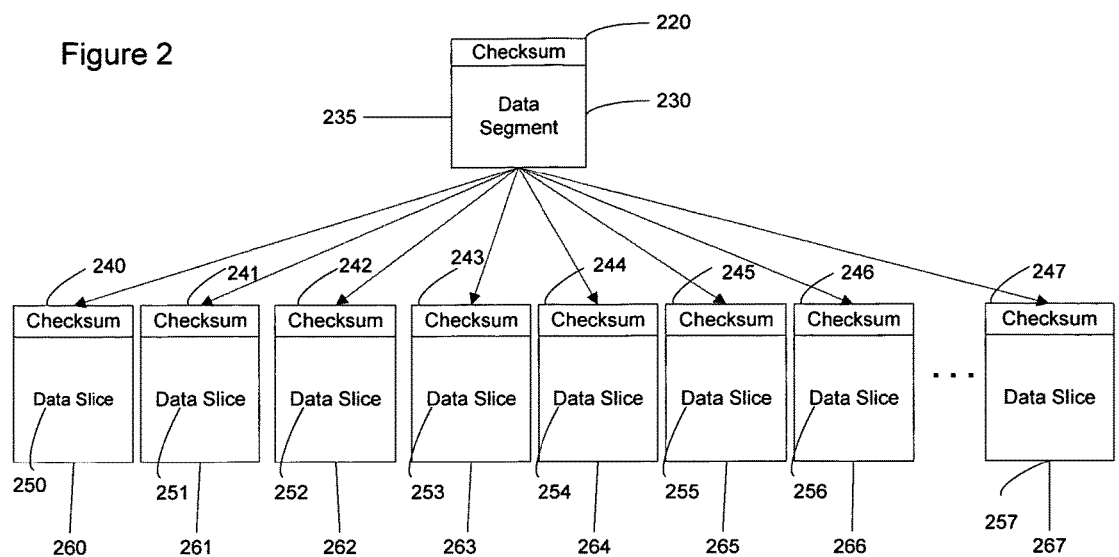
FIG. 2 illustrates the use of checksums on a data segment as well as on an arbitrary number of data slices created from the data segment.

FIG. 2 depicts the use of a checksum 220 on a data segment 230, as well as on the data slices 250-257 that the data segment 230 was divided into. Assuming that a data segment 230 is being written to a DDSN, a checksum 220 will be calculated for and appended to the data segment 230, thereby forming a "certified data segment." The certified data segment 235 will then be sliced as one piece of data resulting in data slices 250-257, i.e., when the data slices 250-257 are recombined, both the data segment 230 and data segment checksum 220 will be recovered. A checksum 240-247 is then calculated for, and appended to each data slice 250-257, forming "certified data slices" 260-267. The certified data slices 260-267 will then be sent to different slice servers.

Figure 3:
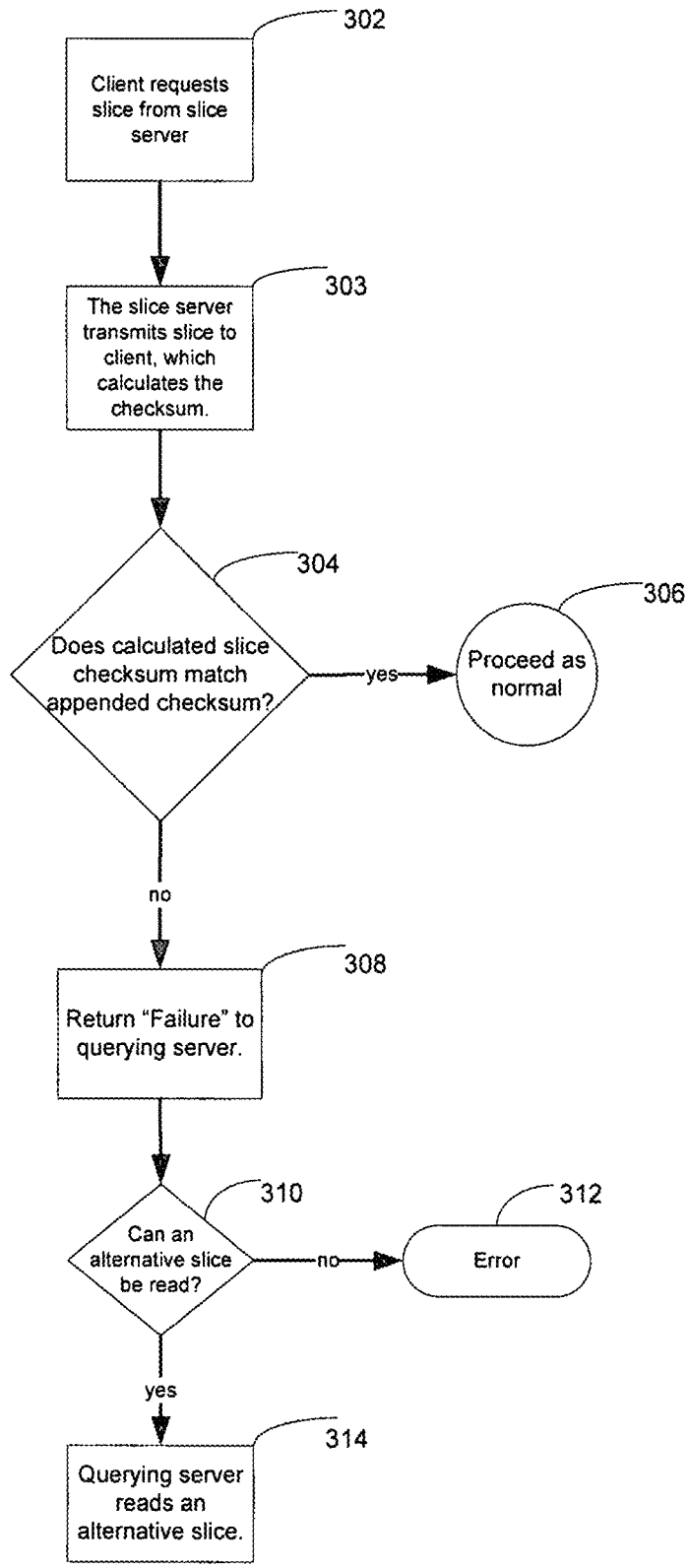
FIG. 3 is a flowchart illustrating the process by which a corrupted data segment can be rebuilt by a dispersed data storage network constructed in accordance with an embodiment of the disclosed invention.

FIG. 3 depicts one possible process by which corrupted slices may be recreated. During a read operation of the DDSN, a client requests a slice from a slice server in step 302. In step 303, the slice server transmits the requested slice to the client, which calculates a checksum for the requested data slice. In step 304, the calculated checksum is compared to the checksum appended to the stored data slice, and if the two checksums match, the read proceeds as normal in step 306. However, if the two checksums do not match, the slice server will transmit a message to a rebuilder application operating on the DDSN indicating that the requested data slice is corrupted in step 308, and return "Failure" to the querying server. The corrupted slice may be rewritten asynchronously as discussed in the text addressing FIG. 6. In step 310, the querying server determines if an alternative slice can be read from a different slice server. If an alternative slice does not exist, the querying server will report an error in step 312. In step 314, the querying computer reads the alternative slice.

Figure 4A:
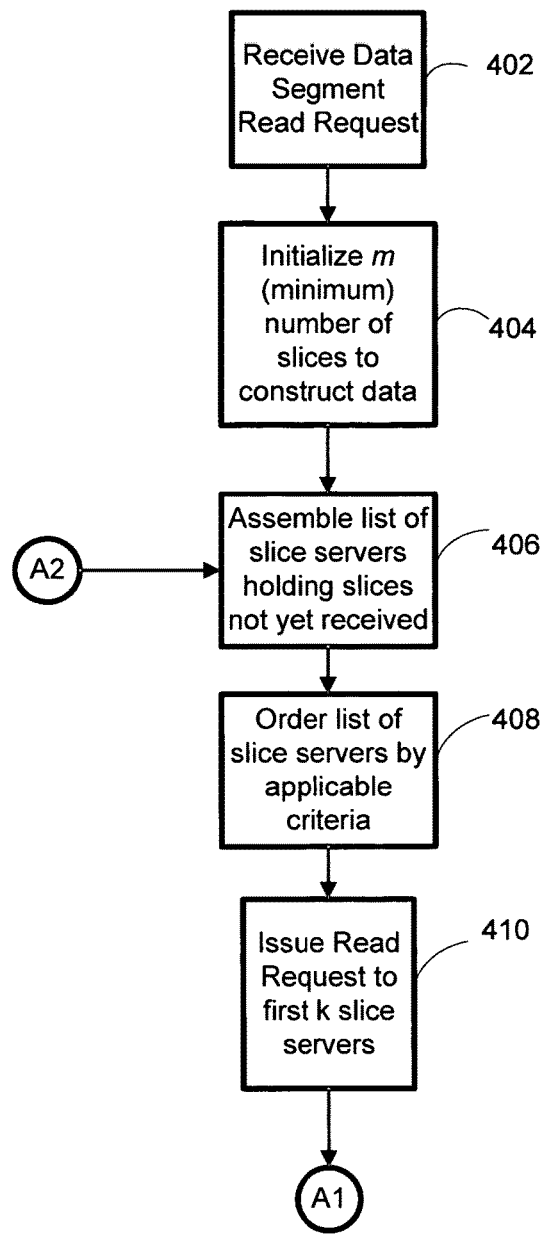
FIGS. 4A-4C collectively illustrates a read operation from a dispersed data storage network constructed in accordance with an embodiment of the disclosed invention.
Figure 4B:
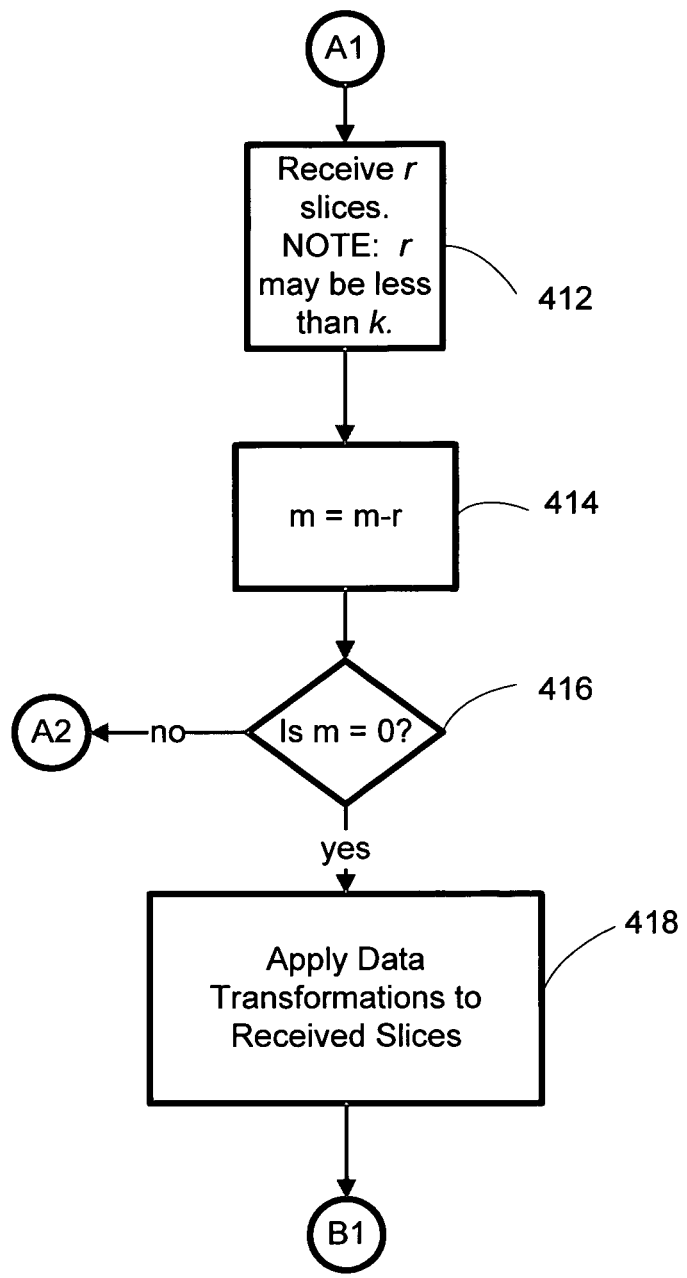
Figure 4C:
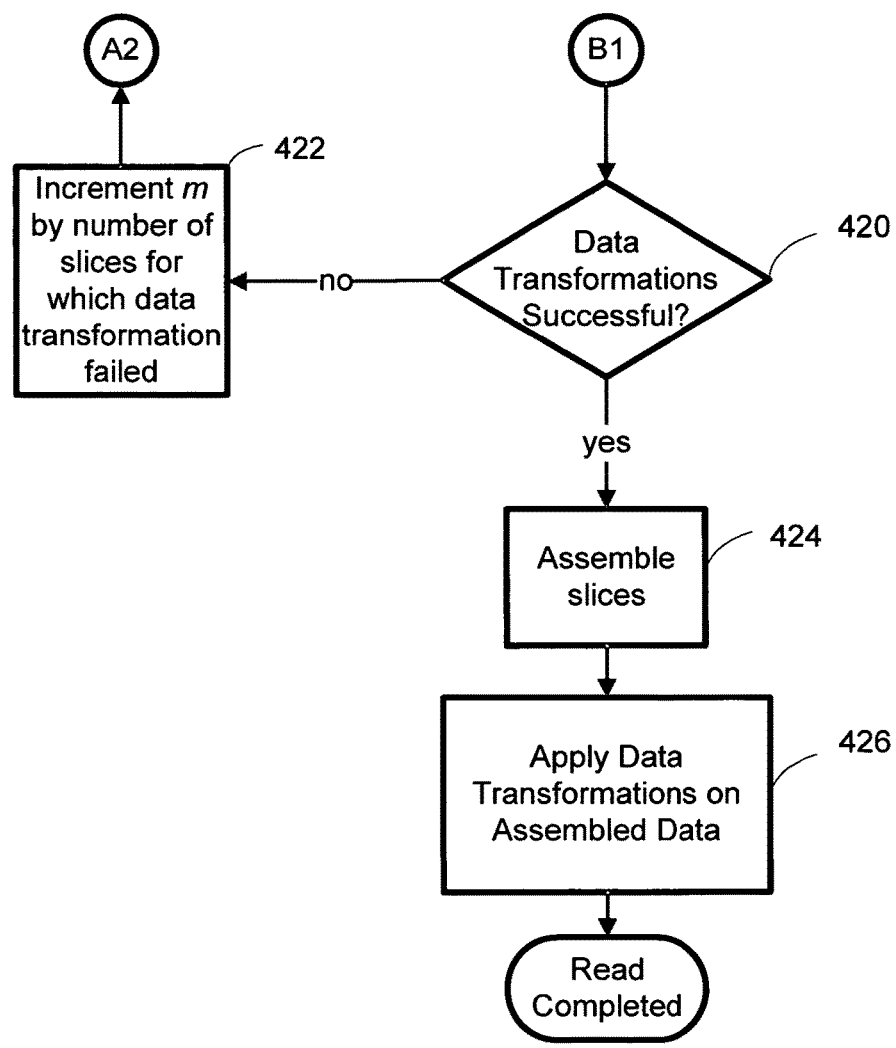

FIGS. 4A-4C show the process by which a DDSN, constructed in accordance with the disclosed invention and used in conjunction with the with the process depicted in FIG. 3, could fulfill a read request. In step 402, a read request is received. Contained within the read request will be information sufficient to determine which slice servers contain applicable data, as well as the minimum number of data slices that must be retrieved before the requested data can be reconstructed. Further information on one method that can be used to associate data requests with particular slice servers is contained in U.S. patent application Ser. No. 11/973,621, titled "VIRTUALIZED DATA STORAGE VAULTS ON A DISPERSED DATA STORAGE NETWORK," filed on Oct. 9, 2007 and assigned to Cleversafe, Inc. In step 404, the variable m is initialized to the minimum number of slices required to construct the requested data segment. As described herein, for each successfully received and validated slice, m is decremented.

In step 406, a list of slice servers each holding a required data slice that has yet to be received is assembled, and in step 408, the list is ordered by any applicable criteria. Further information on criteria by which the list may be ordered is contained in U.S. patent application Ser. No. 11/973,622, titled "SMART ACCESS TO A DISPERSED DATA STORAGE NETWORK," filed on Oct. 9, 2007 and assigned to Cleversafe, Inc. In step 410, read requests are issued to the first k slice servers on the assembled list, where k is at least equal to m, the minimum number of data slices needed to reconstruct the requested data segment, but could be as large as n, the number of data slices that have data relevant to the requested data segment. In step 412, r data slices are received, and in step 414 the number of received data slices r is subtracted from the variable m. In step 416, m is compared to zero, and if m is greater than or equal to zero, execution returns to step 406 and proceeds as normal from there. However, if m is equal to zero, a collection of data transformations may optionally be applied to the received slices in step 418. The applied data transformations can include decryption, decompression, and integrity checking. In accordance with the disclosed invention, each data slice includes a cyclical redundancy check ("CRC"), or other form of checksum appended to the data contained in the slice. This checksum will be compared against a checksum calculated by the receiving slice server against the received data to ensure that the data was not corrupted during the transmission process.

In step 420, it is determined if the applied data transformations were successful for all of the received data slices. If the applied data transformations were not successful for some of the received slices, m is incremented by this number in step 422, and execution is resumed at step 406. The data transformations could fail, for example, if an integrity check revealed that a received data slice was corrupted. However, if the applied data transformations were successful for all received data slices, the received slices are assembled into the requested block of data in step 424. The same or different data transformations may optionally be applied to the assembled data block in step 426, which completes the read process. In accordance with the disclosed invention, a checksum for the data segment will be calculated and compared to a checksum appended to the assembled data segment.

Figure 5A:
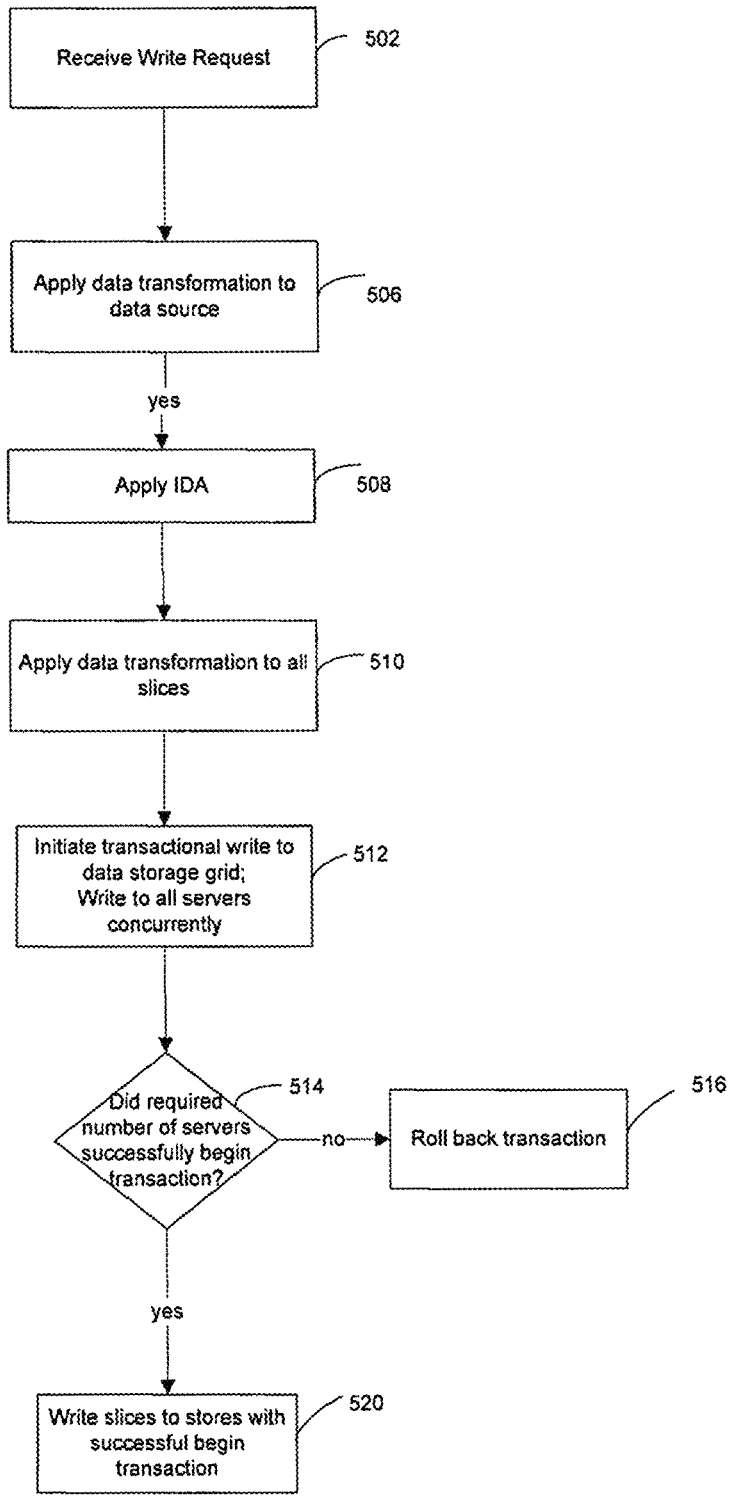
FIGS. 5A-5B collectively illustrates a write operation from a dispersed data storage network constructed in accordance with an embodiment of the disclosed invention.
Figure 5B:
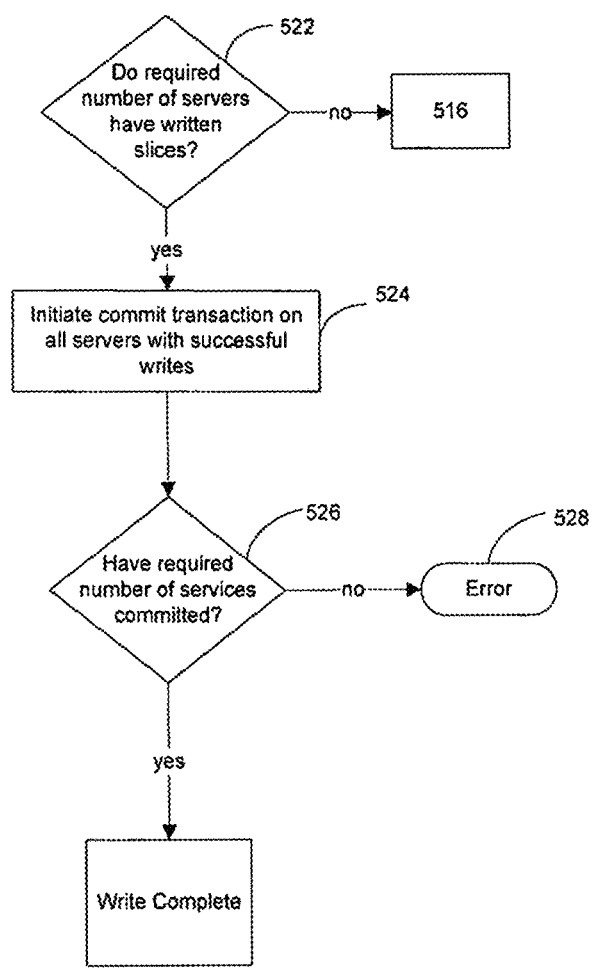

In FIGS. 5A-5B the process by which a DDSN, constructed in accordance with the disclosed invention, could write data to a network of slice servers is illustrated. In step 502 a data segment write request is received. Included in this write request is information sufficient to determine which slice servers the data segment should be written to, as well as information required by the information dispersal algorithm to divide the data segment, i.e., the number of slices to be written, referred to as n, as well as the minimum number of slices that are required to recover the data, referred to as m. Further information on one method that can be used to associate data writes with particular slice servers is contained in United State Patent Application [NO NUMBER ASSIGNED], titled "VIRTUALIZED DATA STORAGE VAULTS ON A DISPERSED DATA STORAGE NETWORK," filed on Oct. 9, 2007 and assigned to Cleversafe, Inc.

A number of data transformations may optionally be applied to each block in step 506, and an information dispersal algorithm is applied in step 508. In particular, the Cauchy Reed-Solomon dispersal algorithm could be applied to the data segment, resulting in a predetermined number of data slices. In step 510, a number of data transformations are optionally applied to each data slice.

In the disclosed system, writes are performed transactionally, meaning that a minimum number of data slices t must be successfully written before a write is deemed complete. Normally, the number of data slices that must be successfully written will be set to n, i.e., the number of slices that the data segment was originally divided into. However, this number can be configured by the user to a lesser number, down to the minimum number of slices required to reconstruct the data. This would allow the user to continue using the DDSN during a minor network outage where one or more slice servers were unavailable. Slices that could not be immediately transmitted and stored could be queued and transmitted when the network outage cleared. In step 512, a write transaction is initiated to the data storage grid. As discussed herein, all slice servers are simultaneously contacted, and in step 514, a confirmation that at least t receiving slice servers are prepared to begin the write transaction, i.e., to store each slice, must be received, or the transaction is rolled back in step 516.

In step 520 data slices are transmitted to the slice servers that indicated their ability to receive and store slices. The number of slice servers that successfully received and stored their assigned data slices is checked in step 522, and if less than t slices are successfully stored, the transaction is rolled back in step 516. In step 524, a commit transaction is begun on all servers with successful writes. If the commit transaction fails, an error is logged in step 528. Otherwise, the write transaction was successful.

Figure 6A:
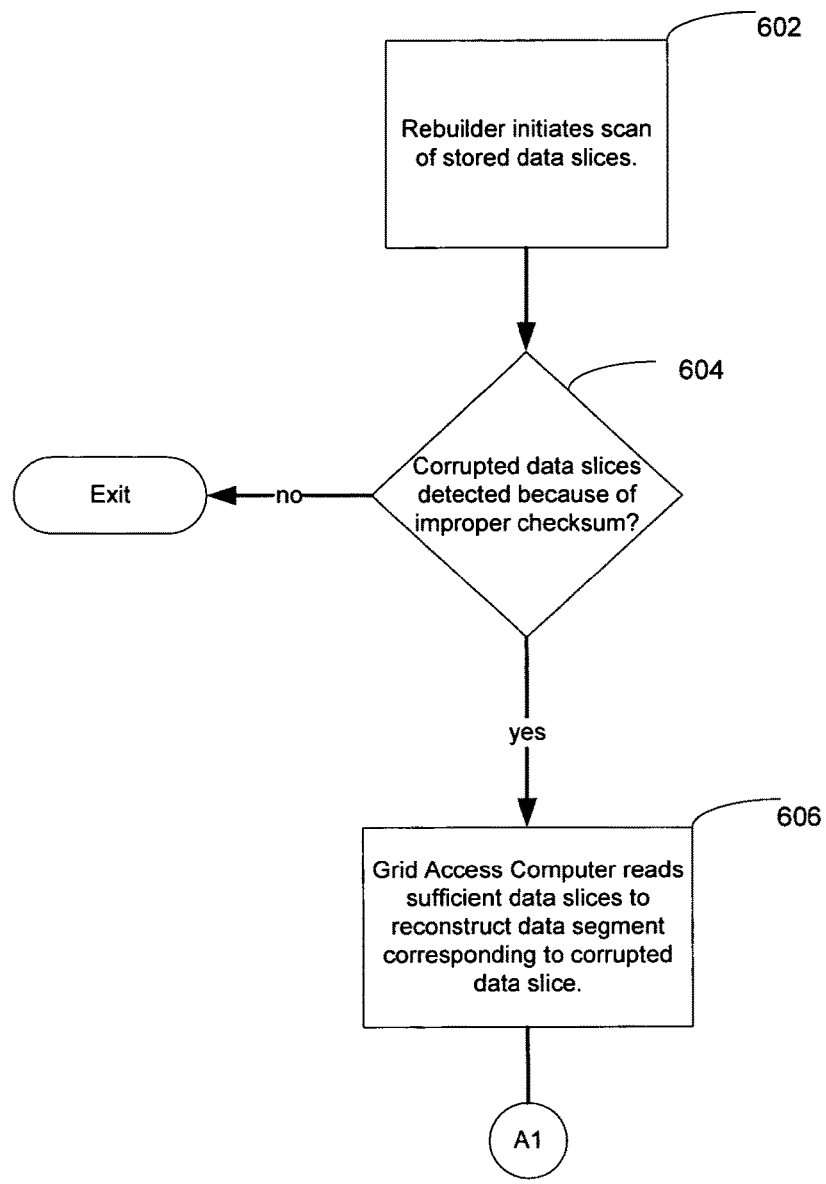
FIGS. 6A-6B collectively illustrates an alternative process by which corrupted data slices may be recreated.
Figure 6B:
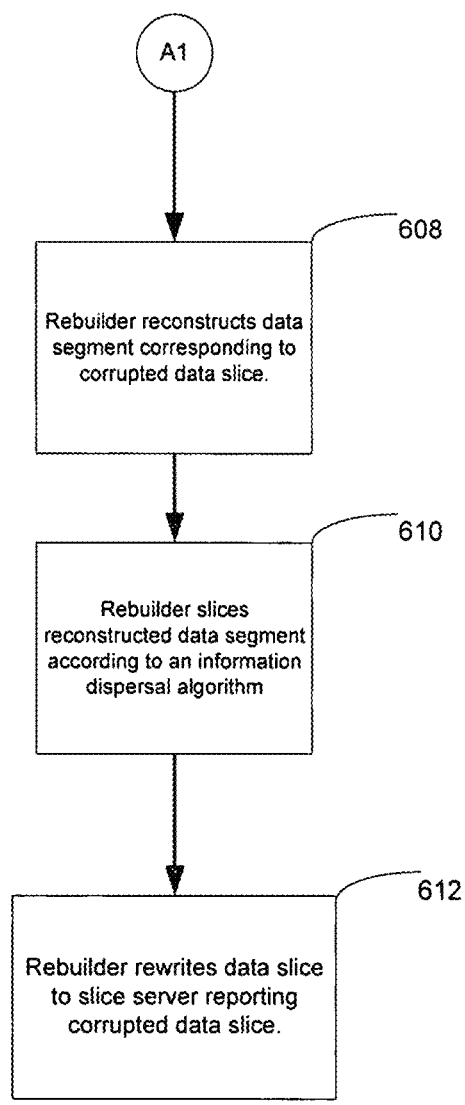

FIGS. 6A-6B are a flow chart illustrating an alternative process by which corrupted data slices may be recreated. In step 602, a scan of data slices is initiated by a rebuilder application operating somewhere on the DDSN. If no corrupted data slice is found, the corrupted slice recreation process is exited in step 604. However, if a corrupted slice is detected because of a failed integrity check, execution proceeds to step 606, where a grid access computer determines what data segment corresponds to the corrupted data slice, and reads that data segment from the DDSN. The grid access computer then reconstructs the data segment in step 608. In step 610, the data segment is re-sliced, and the grid access computer rewrites a non-corrupted version of the corrupted data slice to the appropriate slice server in step 612.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method of ensuring data integrity in a dispersed data storage network, the method comprising:
    calculating a first checksum for a data segment of data;
    appending the first checksum to the data segment to produce an appended data segment;
    encoding the appended data segment to produce a set of encoded data slices, wherein each encoded data slice of the set of encoded data slices includes an encoded representation of at least a portion of the first checksum;
    generating a set of second checksums for the set of encoded data slices;
    appending the set of second checksums to the set of encoded data slices to produce a set of appended encoded data slices; and
    transmitting the set of appended encoded data slices to a plurality of storage units for storage therein;
    when the data segment is to be reconstructed:
        retrieving from the plurality of storage units a threshold number of appended encoded data slices of the set of appended encoded data slices;
        extracting the threshold number of second checksums from the threshold number of appended encoded data slices; and
        verifying accuracy of the threshold number of appended encoded data slices based on the extracted threshold number of second checksums; and
        when verifying the accuracy of the threshold number of appended encoded data slices indicates that the threshold number of appended encoded data slices includes a corrupted appended encoded data slice therein:
            retrieving from at least some of the plurality of storage units a sufficient number of appended encoded data slices needed to generate a reconstructed data segment based on the threshold number of appended encoded data slices that includes the corrupted appended encoded data slice;
            generating the reconstructed data segment using the sufficient number of appended encoded data slices;
            performing an error correcting information dispersal algorithm on the reconstructed data segment thereby forming a reconstructed set of data slices;
            calculating a plurality of second checksums for the reconstructed set of data slices;
            appending the plurality of second checksums respectively to the reconstructed set of data slices thereby forming a reconstructed set of appended encoded data slices; and
            replacing the corrupted appended encoded data slice with a reconstructed appended encoded data slice of the reconstructed set of appended encoded data slices; and
        when the accuracy of the threshold number of appended encoded data slices has been verified:
            decoding the threshold number of appended encoded data slices to recover the appended data segment;
            extracting the first checksum from the recovered appended data segment;
            verifying accuracy of the recovered appended data segment based on the first checksum; and
            when the accuracy of the recovered appended data segment has been verified, providing the recovered appended data segment as a valid data segment.

2. The method of claim 1 further comprising:
    performing an integrity check on the set of appended encoded data slices stored within the plurality of storage units based on at least one of the set of second checksums or the first checksum;
    identifying a corrupted appended encoded data slice within the set of appended encoded data slices based on the integrity checks;
    generating a reconstructed set of appended encoded data slices corresponding to the set of appended encoded data slices; and
    replacing the corrupted appended encoded data slice with one of the reconstructed appended encoded data slices from the reconstructed set of appended encoded data slices.

3. The method of claim 1 further comprising:
    after transmitting the set of appended encoded data slices to the plurality of storage units to be stored therein, determining successful storage of the set of appended encoded data slices based on the at least the threshold number of appended encoded data slices from the set of appended encoded data slices needed respectively to reconstruct the set of appended encoded data slices being stored among the plurality of storage units.

4. The method of claim 1, wherein at least one of the first checksum or the set of second checksums is based on a cyclic redundancy check.

5. The method of claim 1, wherein the encoding of the appended data segment to produce the set of encoded data slices includes at least one of Reed-Solomon coding or Cauchy Reed-Solomon coding.

6. The method of claim 1, wherein a first of the plurality of storage units is remotely located from a second of the plurality of storage units within the dispersed data storage network.

7. A computer comprising:
  a port configured to support communications with a dispersed data storage network;
  an application, coupled to the port, that is configured to enable a computer to:
    calculate a first checksum for a data segment of data;
    append the first checksum to the data segment to produce an appended data segment;
    encode the appended data segment to produce a set of encoded data slices, wherein each encoded data slice of the set of encoded data slices includes an encoded representation of at least a portion of the first checksum;
    generate a set of second checksums for the set of encoded data slices;
    append the set of second checksums to the set of encoded data slices to produce a set of appended encoded data slices; and
    transmit the set of appended encoded data slices to a plurality of storage units for storage therein; and
    when the data segment is to be reconstructed:
      identify whether a threshold number of appended encoded data slices includes a corrupted appended encoded data slice therein; and
      when the threshold number of appended encoded data slice includes the corrupted appended encoded data slice:
        retrieve, from at least some of a plurality of storage units of the dispersed data storage network, a sufficient number of appended encoded data slices needed to generate a reconstructed data segment based on the threshold number of appended encoded data slices that includes the corrupted appended encoded data slice;
        generate the reconstructed data segment using the sufficient number of appended encoded data slices;
        perform an error correcting information dispersal algorithm on the reconstructed data segment thereby forming a reconstructed set of data slices;
        calculating a plurality of second checksums for the reconstructed set of data slices;
        append the plurality of second checksums respectively to the reconstructed set of data slices thereby forming a reconstructed set of appended encoded data slices; and
        replace the corrupted appended encoded data slice with one of the reconstructed set of appended encoded data slices.

8. The computer of claim 7, wherein the application, coupled to the port, is further configured to enable the computer to:
  retrieve from the plurality of storage units a threshold number of appended encoded data slices of the set of appended encoded data slices;
  extract the threshold number of second checksums from the threshold number of appended encoded data slices;
  verify accuracy of the threshold number of appended encoded data slices based on the extracted threshold number of second checksums;
  when the accuracy of the threshold number of appended encoded data slices has been verified:
    decode the threshold number of appended encoded data slices to recover the appended data segment;
    extract the first checksum from the recovered appended data segment;
    verify accuracy of the recovered appended data segment based on the first checksum; and
    when the accuracy of the recovered appended data segment has been verified, providing the recovered appended data segment as a valid data segment.

9. The computer of claim 7, wherein the application, coupled to the port, is further configured to enable the computer to:
  after transmitting the set of appended encoded to the plurality of storage units to be stored therein, determine successful storage of the set of appended encoded based on the at least the threshold number of appended encoded data slices.

10. The computer of claim 7 further comprising:
  a grid computer that is coupled to the plurality of storage units via the dispersed data storage network.

11. The computer of claim 7, wherein the encoding of the appended data segment to produce the set of encoded data slices includes at least one of Reed-Solomon coding or Cauchy Reed-Solomon coding.

12. The computer of claim 7, wherein:
  a first of the plurality of storage units is remotely located from a second of the plurality of storage units within the dispersed data storage network; and
  at least one of the first of the plurality of storage units or the second of the plurality of storage units is remotely located from the computer within the dispersed data storage network.

13. A computer comprising:
  a port configured to support communications with a dispersed data storage network;
  an application, coupled to the port, that is configured to enable a computer to:
  when a data segment is to be reconstructed:
    retrieving, from a plurality of storage units of the dispersed data storage network, a threshold number of appended encoded data slices of a set of appended encoded data slices;
    extracting a threshold number of second checksums from the threshold number of appended encoded data slices; and
    verifying accuracy of the threshold number of appended encoded data slices based on the extracted threshold number of second checksums;
    when the threshold number of appended encoded data slices includes a corrupted appended encoded data slice therein:
      retrieve, from at least some of the plurality of storage units, a sufficient number of appended encoded data slices needed to generate a reconstructed data segment based on the threshold number of appended encoded data slices that includes the corrupted appended encoded data slice;
      generate the reconstructed data segment using the sufficient number of appended encoded data slices;
      perform an error correcting information dispersal algorithm on the reconstructed data segment thereby forming a reconstructed set of data slices;
      calculating a plurality of second checksums for the reconstructed set of data slices;
      append the plurality of second checksums respectively to the reconstructed set of data slices thereby forming a reconstructed set of appended encoded data slices; and
      replace the corrupted appended encoded data slice with one of the reconstructed set of appended encoded data slices; and when the accuracy of the threshold number of appended encoded data slices has been verified:
  decoding the threshold number of appended encoded data slices to recover the appended data segment;
  extracting the first checksum from the recovered appended data segment;
  verifying accuracy of the recovered appended data segment based on the first checksum; and
when the accuracy of the recovered appended data segment has been verified, providing the recovered appended data segment as a valid data segment.

14. The computer of claim 13, wherein the application, coupled to the port, is further configured to enable the computer to:
  perform an integrity check on the set of appended encoded data slices stored within the plurality of storage units based on at least one of the set of second checksums or the first checksum;
  identify a corrupted certified data slice within a set of appended encoded data slices based on the integrity check;
  generate a reconstructed set of appended encoded data slices corresponding to the set of appended encoded data slices; and
  replace the corrupted appended encoded data slice with one of the reconstructed set of appended encoded data slices.

15. The computer of claim 13 further comprising:
a grid computer that is coupled to the plurality of storage units via the dispersed data storage network.

16. The computer of claim 13, wherein the encoding of the appended data segment to produce the set of encoded data slices includes at least one of Reed-Solomon coding or Cauchy Reed-Solomon coding.

17. The computer of claim 13, wherein:
  a first of the plurality of storage units is remotely located from a second of the plurality of storage units within the dispersed data storage network; and
  at least one of the first of the plurality of storage units or the second of the plurality of storage units is remotely located from the computer within the dispersed data storage network.

* * * * *